March 18, 1924.
J. RATTO
AUTOMOBILE LOCK
Filed Sept. 13, 1921
1,487,603
2 Sheets-Sheet 1
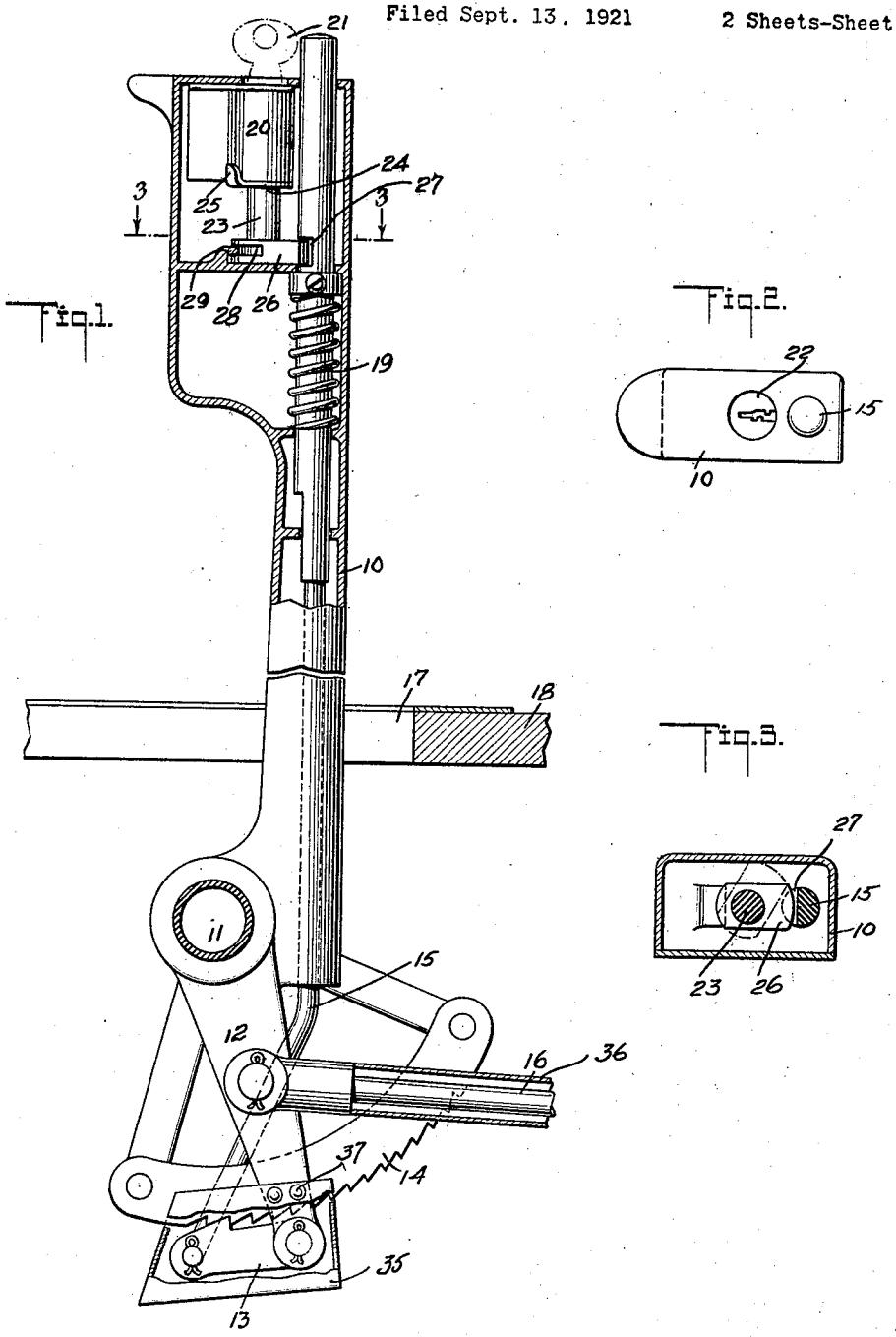
WITNESSES
INVENTOR
JOSEPH RATTO
BY
ATTORNEYS March 18, 1924.
J. RATTO
1,487,603
AUTOMOBILE LOCK
Filed Sept. 13, 1921　　2 Sheets-Sheet 2
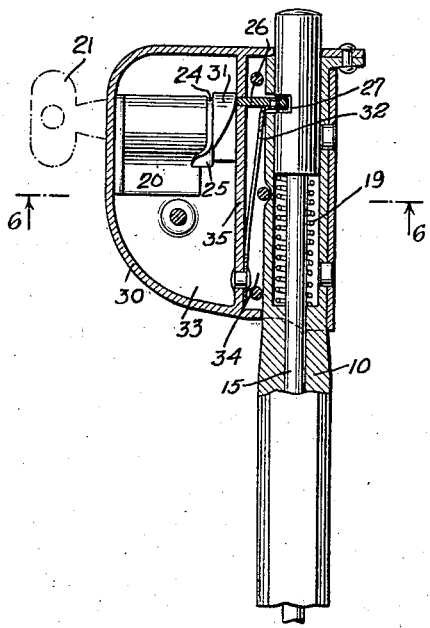
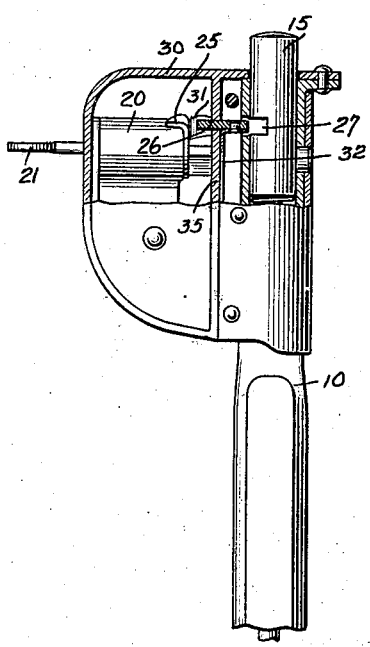
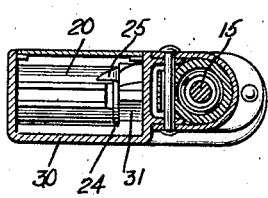
WITNESSES
INVENTOR
JOSEPH RATTO
BY
ATTORNEYS Patented Mar. 18, 1924.

1,487,603

UNITED STATES PATENT OFFICE.

JOSEPH RATTO, OF BROOKLYN, NEW YORK.

AUTOMOBILE LOCK.

Application filed September 13, 1921. Serial No. 500,325.

*To all whom it may concern:*

Be it known that I, JOSEPH RATTO, a citizen of the United States, and a resident of the city of New York, borough of Brooklyn, in the county of Kings and State of New York, have invented a new and Improved Automobile Lock, of which the following is a full, clear, and exact description.

This invention relates to locks for use in conjunction with levers to prevent their operation and was primarily designed for use with emergency brakes for automobiles.

The general object of this invention is the provision of means in conjunction with the lever for preventing its operation.

This object is accomplished by providing a lever including a pawl rod and means associated therewith for engaging the pawl rod to prevent its movement.

This and other objects of the invention will be more clearly understood from the following detailed description and accompanying drawings.

Figure 1 is a side elevation of the device attached to a machine with a part of the lever casing broken away;

Figure 2 is a top plan view of the lever casing;

Figure 3 is a cross section along the line 3—3, Figure 1;

Figure 4 is a side elevation of a modification of the locking device with a portion of the casing broken away;

Figure 5 is a side elevation of the device shown in Figure 4 showing the pawl rod released; and Figure 6 is a cross section along the line 6—6, Figure 4.

Referring to the above-mentioned drawings, a lever 10 is made in the form of a casing. This casing is fulcrumed at 11 and serves to operate a bar 12 when the pawl 13 is released from the rack 14. A pawl rod 15 is slidably mounted in the lever 10 and serves to operate the pawl 13. When the pawl 13 is released from the rack 14 the lever 10 may be operated to apply the brakes through the connecting rod 16 which is pivotally connected to the bar 12. The lever 10 moves in a slot 17 cut in the automobile floor 18. The pawl rod 15 is normally held in a raised position by means of a spring 19, thus holding the pawl 13 in engagement with the teeth of the rack 14. A casing 35 which encloses the pawl 13 is attached to the bar 12 by means of rivets 37. This prevents the operation of the pawl by any means other than the pawl rod 15. A chute 36 is provided to protect the connecting rod 16.

The means for preventing the operation of the pawl rod 15 consists of a lock 20 which is mounted in an enlarged portion of the lever 10. This lock 20 is of any usual construction and is operated by means of a key 21. Attached to the lock plug 22 is a shaft 23 and a plate 24. The plate 24 has a projection 25 extending upward which serves as a means for limiting the movement of the lock plug 22. Mounted on the shaft 23 is a latch 26 that may be rotated to engage in a slot 27 cut in the upper portion of the pawl rod 15. This latch is guided in its movement by means of a slot 28 and a guide 29 which co-operates with the slot 28. The device described above is a lever and locking means that may be applied to an automobile or any other vehicle when it is under construction.

The modification of the locking means shown in Figure 4 is preferably designed for application to a motor vehicle after construction but it may also be applied to a motor vehicle during construction. It consists of a casing 30 mounted on the lever 10. The casing 30 is divided into two compartments 33 and 34. The lock 20 is mounted in the compartment 33. The latch 26 is slidably mounted in the wall 35 between the compartments. This latch is controlled by a spring 32 which normally holds the latch 26 out of engagement with the slot 27 in the pawl rod 15. A cam 31 is attached to the lock plug and is rotated by means of the lock plug. The remainder of the construction of the lock is the same as that described in the preceding paragraph. In Figure 5, the cam 31 is shown rotated out of contact with the latch 26 and the latch 26 is shown moved back out of its active position by means of the spring 32.

Considering the lever and lock structure as shown in Figure 1, the operation is as follows:

When it is desired to leave the motor vehicle standing in some place where it is not continually under observation, the emergency brakes are applied by operating the lever 10. After the brakes have been applied the lock plug 22 is rotated by means of key 21. The shaft 23 is fixed to the lock plug and the latch 26 is fixed to the shaft 23. Thus the latch 26 is rotated and engages in the slot 27 in the pawl rod 15. When the latch 26 is rotated to this position the lock plug 22 is rotated to a position where the key 21 may be removed. The pawl rod 15 cannot be operated without removing the latch 26 and thus the pawl 13 is locked in engagement with the rack 14 and the brakes are applied and it is impossible to operate the vehicle. When the key 21 is inserted in the lock plug and rotated to remove the latch 26 from the slot 27 it is locked in position and may not be removed until the pawl rod 15 is again locked. This prevents the loss of the key.

In the modification shown in Figures 4, 5 and 6, the construction of the latch is different from that shown in Figure 1. In this case the latch is controlled by the spring 32 which normally holds it out of engagement with the pawl rod 15. When it is desired to lock the pawl rod in position the key 21 is inserted in the lock plug 22 and rotated bringing the cam 31 into contact with the latch and forcing the latter into the slot cut in the pawl rod 15. The plate 24 which is fixed to the lock plug 22 limits the angle through which the cam may be rotated.

I would state in conclusion that while the illustrated examples constitute practical embodiments of my invention, I do not limit myself strictly to the exact details herein illustrated since manifestly the same can be considerably varied without departing from the spirit of the invention as defined in the appended claims.

Claims:

1. A lever controlling mechanism comprising a casing having a transverse partition defining a pair of chambers, one of which is adapted for the reception of the rear end portion of the lever and the controlling member of the lever, a latch slidably carried by said partition and adapted for locking engagement with said pawl controlling member, a leaf spring connected at one end of said partition and at the other end to said latch for urging the latch out of engagement with said pawl controlling member, a lock in the other chamber and having a lock plug provided at the forward end thereof with a cam face adapted to contact with and operate said latch, and means mounted on said lock plug for limiting the rotation of the lock plug.

2. A lever controlling mechanism comprising a casing having a transverse partition defining a pair of chambers, one of which is adapted for the reception of the rear end portion of the lever and the controlling member of the lever, a latch slidably carried by said partition and adapted for locking engagement with said pawl controlling member, a leaf spring connected at one end of said partition and at the other end to said latch for urging the latch out of engagement with said pawl controlling member, a lock in the other chamber and having a lock plug provided at the forward end thereof with a cam face adapted to contact with and operate said latch.

JOSEPH RATTO.